(12) United States Patent
Abdul Kader Jailani (10) Patent No.: US 8,102,630 B2
(45) Date of Patent: Jan. 24, 2012

(54) METHOD FOR MAINTAINING CONNECTIVITY IN FAILED SWITCHES OF STACK

(76) Inventor: Sahul Hameed Abdul Kader Jailani, San Jose, CA (US)

( * ) Notice: Subject to any disclaimer, the term of this patent is extended or adjusted under 35 U.S.C. 154(b) by 597 days.

(21) Appl. No.: 12/177,678

(22) Filed: Jul. 22, 2008

(65) Prior Publication Data

US 2010/0020676 A1    Jan. 28, 2010

(51) Int. Cl.
*G01R 31/08*    (2006.01)

(52) U.S. Cl. .......................................... 361/54; 370/217

(58) Field of Classification Search .................... 361/54; 370/217

See application file for complete search history.

(56) References Cited

U.S. PATENT DOCUMENTS 6,928,049 B2 *   8/2005   Shabtay et al. .............. 370/223
2003/0193891 A1 *  10/2003  Chen et al. .................... 370/217

* cited by examiner

*Primary Examiner* — Danny Nguyen

(57) ABSTRACT

Plural of switches are connected as switch stacking for easier management. Failures of stack member switches disrupts the stack and network availability. This invention discloses a method to maintain stacking connections in failed switches. This invention introduces a small circuit to monitor health of the switch and short circuit the stacking connections in case of switch failures.

1 Claim, 12 Drawing Sheets

UL – Refers Uplink
DL – Refers downlink

UL – Refers Uplink
DL – Refers downlink

METHOD FOR MAINTAINING CONNECTIVITY IN FAILED SWITCHES OF STACK

CROSS-REFERENCE TO RELATED APPLICATIONS

Not Applicable

STATEMENT REGARDING FEDERALLY SPONSORED RESEARCH

Not Applicable

REFERENCE TO SEQUENCE LISTING

Not Applicable

BACKGROUND OF THE INVENTION

1. Field of the Invention

This invention relates to network devices switches and routers. It is more particularly related to switch stacking where individual switching units are connected in stack for easier management.

2. Prior Art

Figure 1:
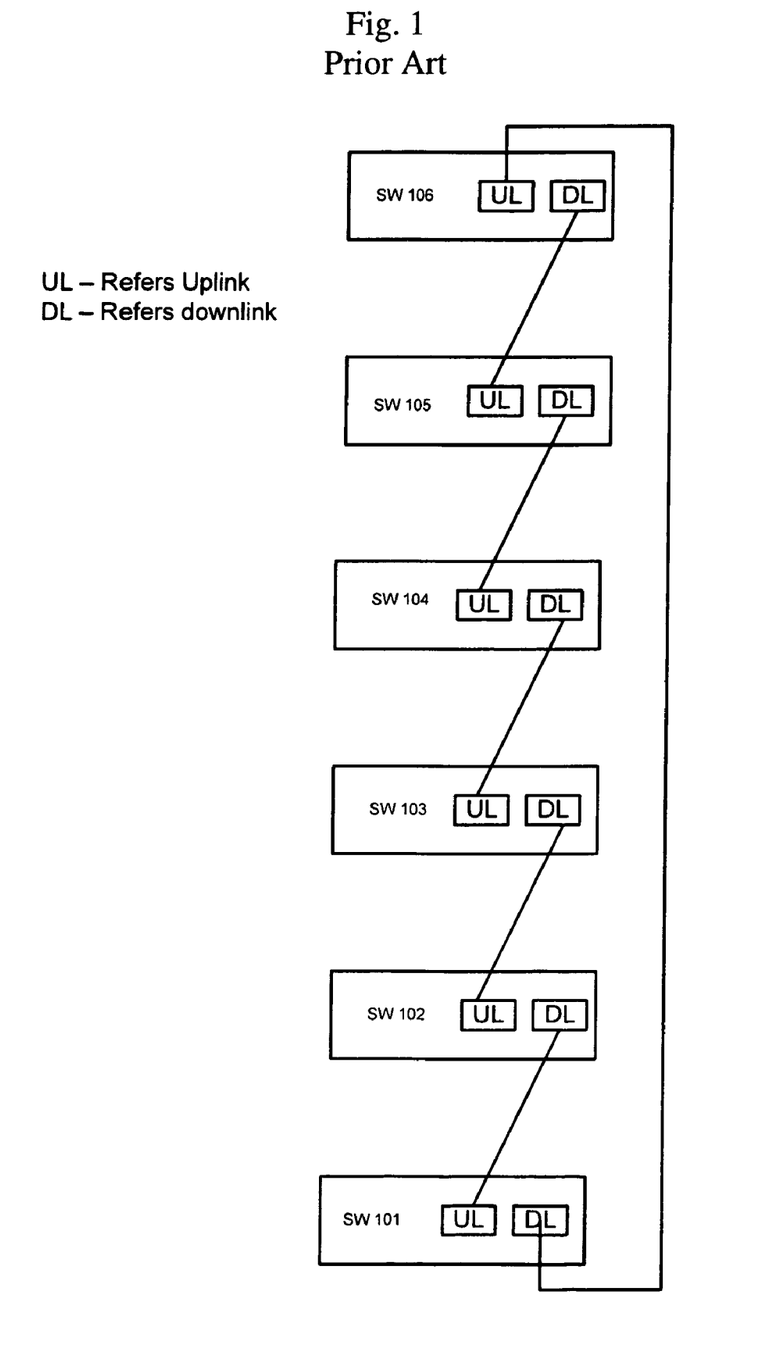
FIG. 1 shows closed loop stacking connections.
Diagram

Network switching devices are connected as stack of switches for easier management. Stackable switches have stack modules to connect with other switches. The stack module has two stacking ports as uplink port and downlink port. Stacking ports of switches are connected to form a stacked switch. The uplink port of a switch (Si) is connected with downlink port of the switch above (Si+1). The uplink port of the top most switch is connected with downlink of the bottom most switch. This forms a closed loop of stacking connections. This connection is shown in diagram FIG. 1.

Figure 2:
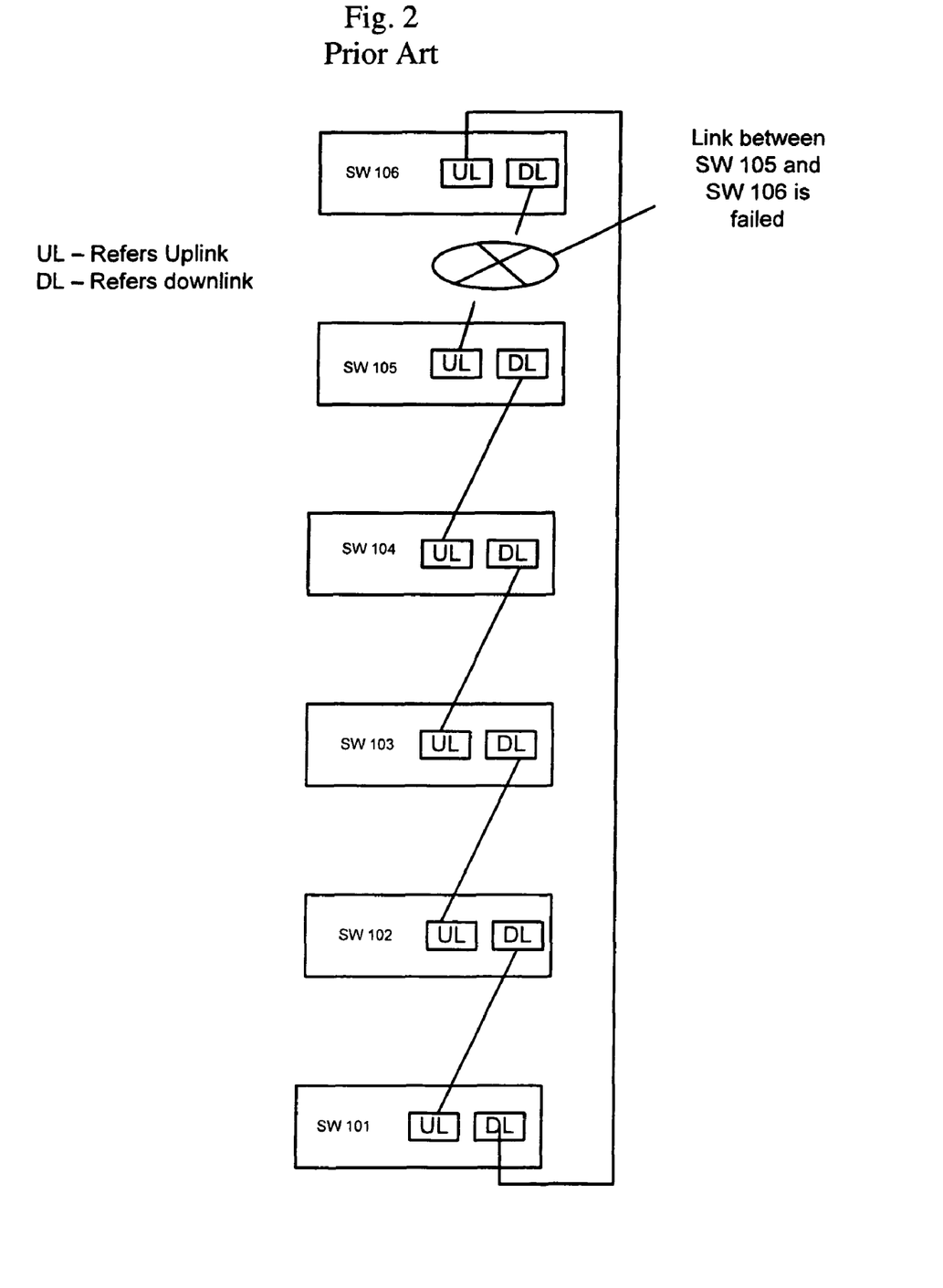
FIG. 2 shows stacking link failure scenario.
Diagram

The closed loop of stacking connections provides redundancy in case of a link or switch failures. If any one of the link failed in stack still the complete stack is manageable through other link. The link failure scenario is shown in diagram FIG. 2.

Figure 3:
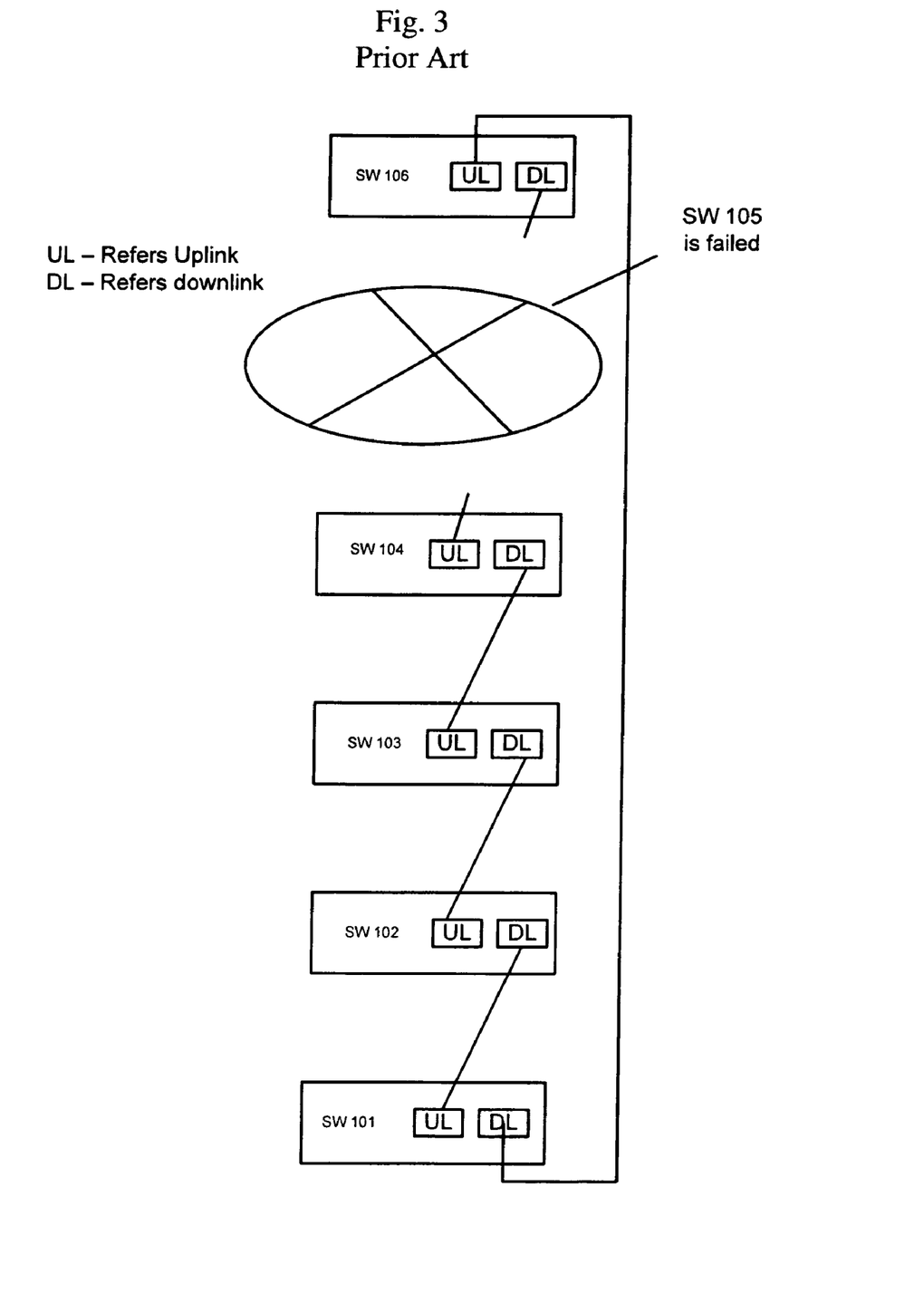
FIG. 3 shows stacking switch failure scenario.
Diagram

In practical, more than link failures switch failures are common. Switch failures are expected occasionally due to the complex hardware and software involved. In case of a switch failure in stack, the stack of working switches is still manageable through other redundant link. This switch failure scenario is shown in diagram FIG. 3.

Figure 4:
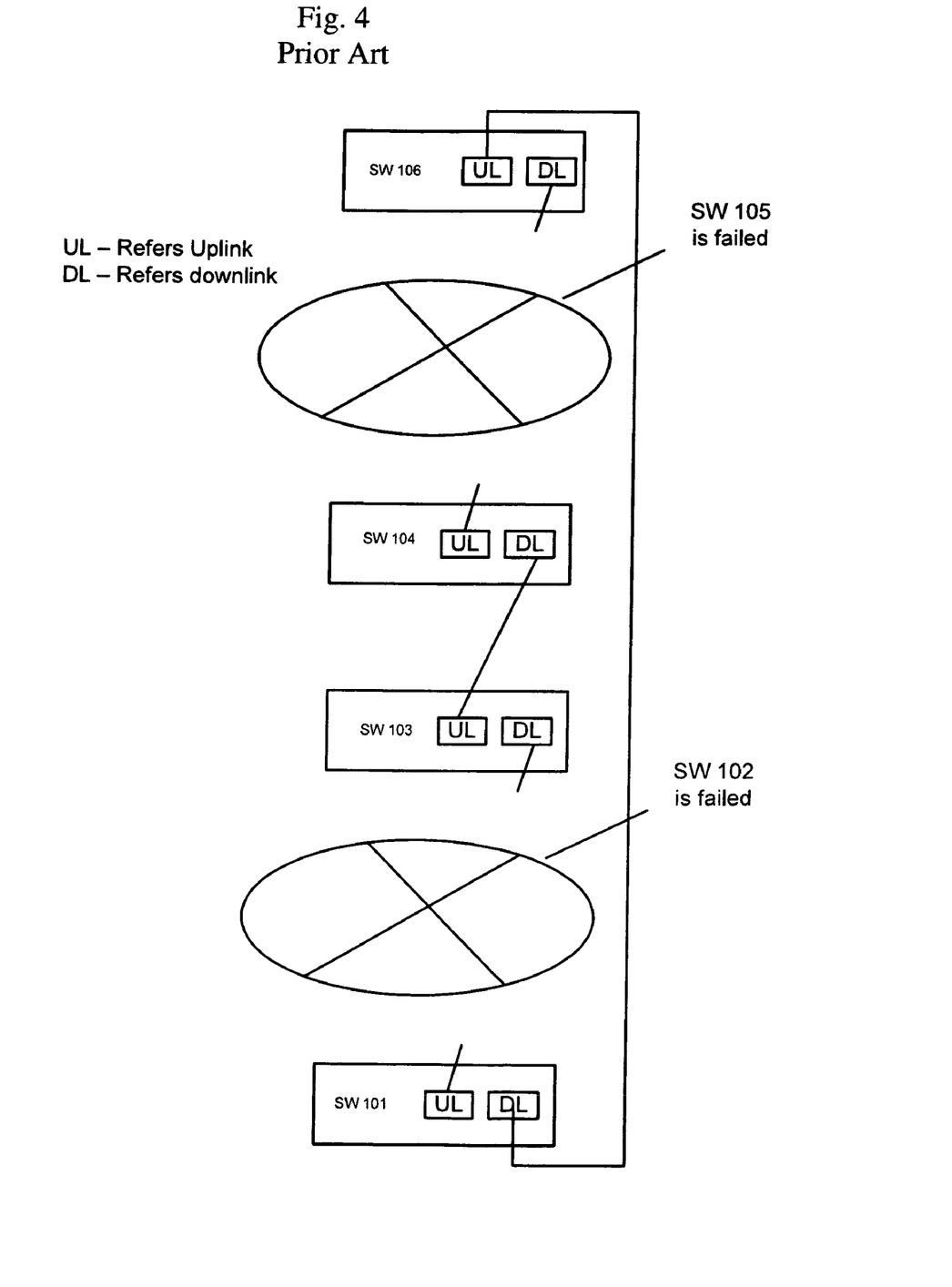
FIG. 4 shows two switch failure scenarios.
Diagram

Switch stacking with a redundant link stays connected with no disruption when a failure occurs. This redundant link safeguards against only the first failure. If second or more failures happen the stack gets disrupted. Based on the failure points, the stack might split as multiple stacks or individual switches. This second failure scenario is shown in diagram FIG. 4. Adding further redundant links to handle multiple failures is not a cost effective option. The stacking techniques need to improve to provide better fault tolerance service.

SUMMARY OF THE INVENTION

This invention disclosed a method for maintaining connectivity in failed switches of stack. This invention uses a simple stacking connector circuit between stacking ports and switch ASIC interfaces.

In normal operating conditions this stacking connector circuit connects the stacking ports with switch ASIC transparently.

In failure conditions, this stacking connector circuit disconnects stacking ports from switch ASIC. It short circuits the stacking ports. This short circuiting of stacking ports provides physical connectivity on stacking links for other switches.

The stacking connector circuit detects the switch failures using a keep alive signal. This keep alive signal is driven by switch management software periodically. If there is no signal on keep alive signal connection for a predetermined time, stacking connector circuit consider as a switch failure. On detection of switch failure this circuit short circuits the stacking ports.

This method of maintaining connectivity in failed switches helps building better fault tolerant stacking systems.

BRIEF DESCRIPTION OF THE SEVERAL VIEWS OF THE DRAWING

The objects and features of the invention will be more understood with reference to the following description and the attached drawings, wherein.

Diagram

DETAILED DESCRIPTION OF THE INVENTION

This invention discloses a method for maintaining connectivity in failed switches of stack.

Figure 5:
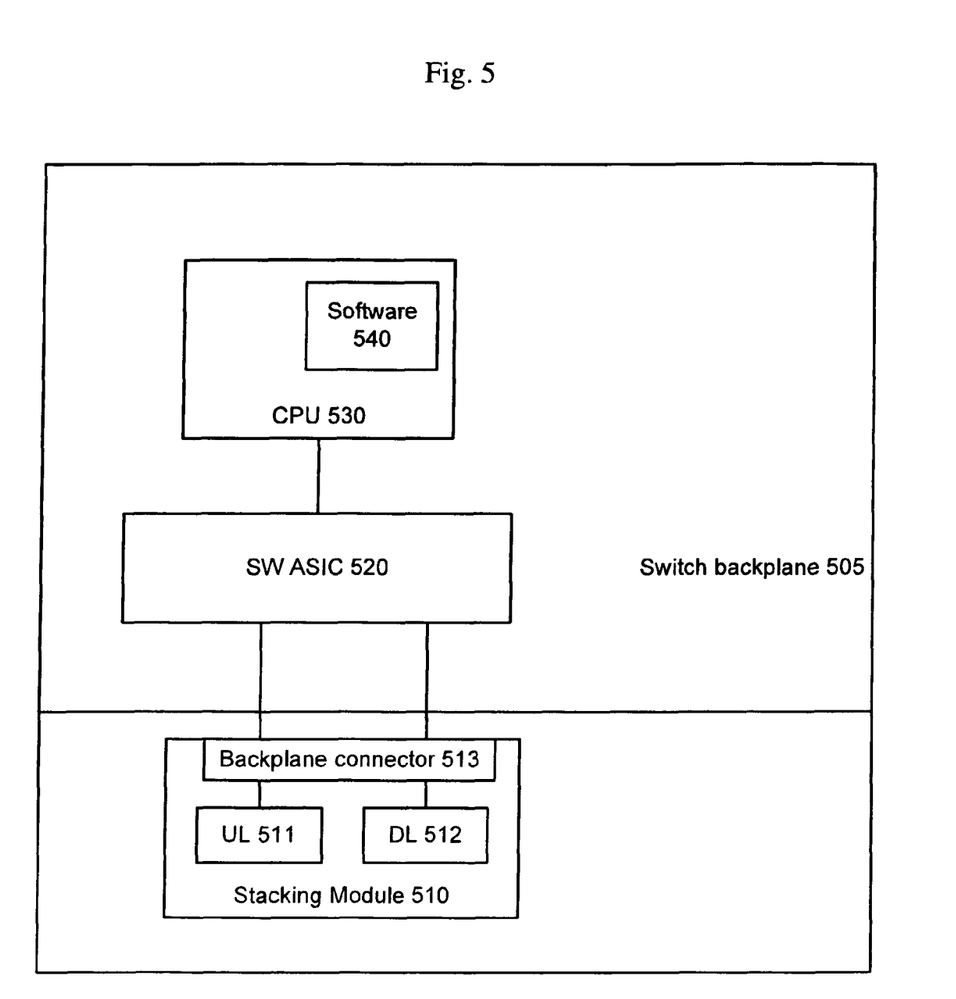
FIG. 5 shows block diagram of stackable switch.
Diagram

The diagram FIG. 5 shows the key components of stackable switch. CPU 530 runs switch management software 540 to manage the switch operations. SWASIC 520 is the core switching component. SWASIC 520 is generally made of Application Specific Integrated Circuits (ASIC) to support high performance switching. SM 510 is stack module providing stacking ports.

SM 510 provides two stacking ports as UL 511 and DL 512 for uplink and downlink. These stacking ports can be of any physical interface including but not limited to RJ45, CX4, SFP, XFP, or SFP+. These stacking ports are connected with SWASIC 520 through backplane connector BP 513. BP 513 is a simple passive connector. The diagram FIG. 6 shows the details of SM 510 components and connections.

Figure 6:
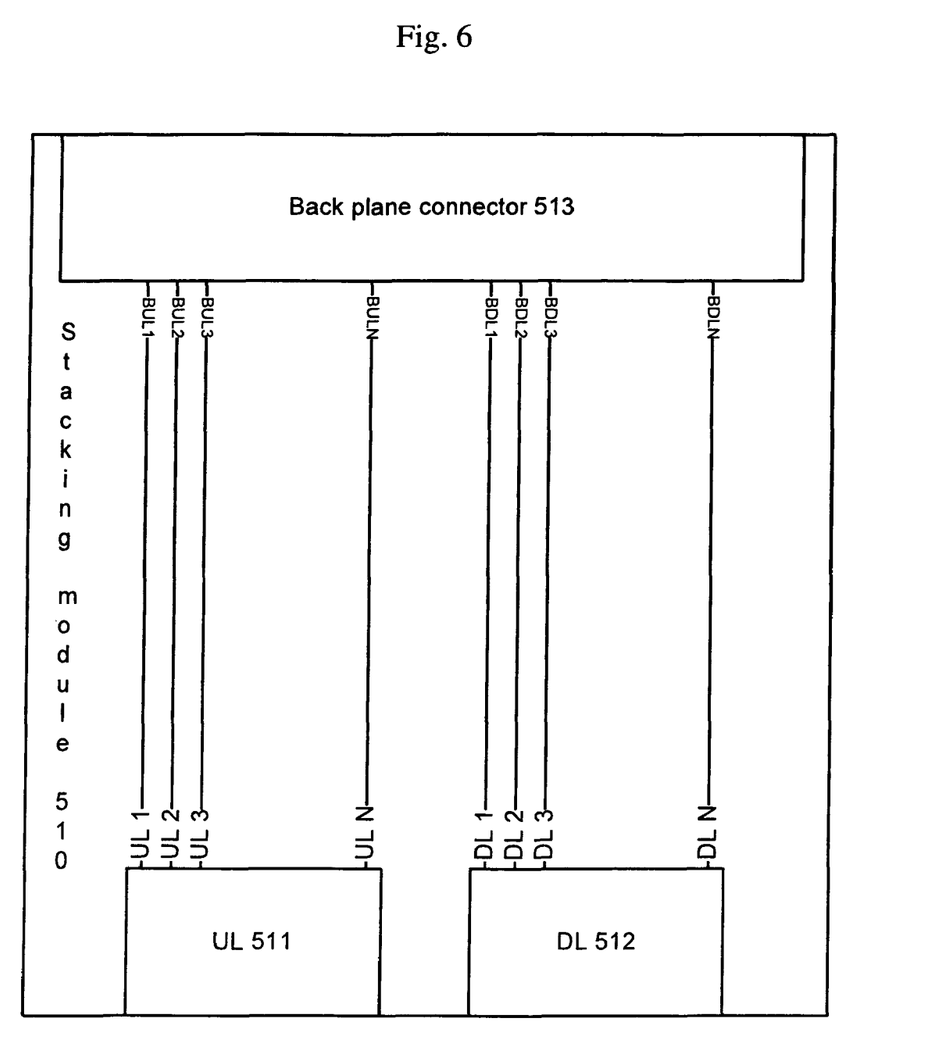
FIG. 6 shows stacking module components.
Diagram

The diagrams FIG. 5 and FIG. 6 show only the components relevant to this invention whereas the actual switching units have many other components to provide full functionality.

Figure 7:
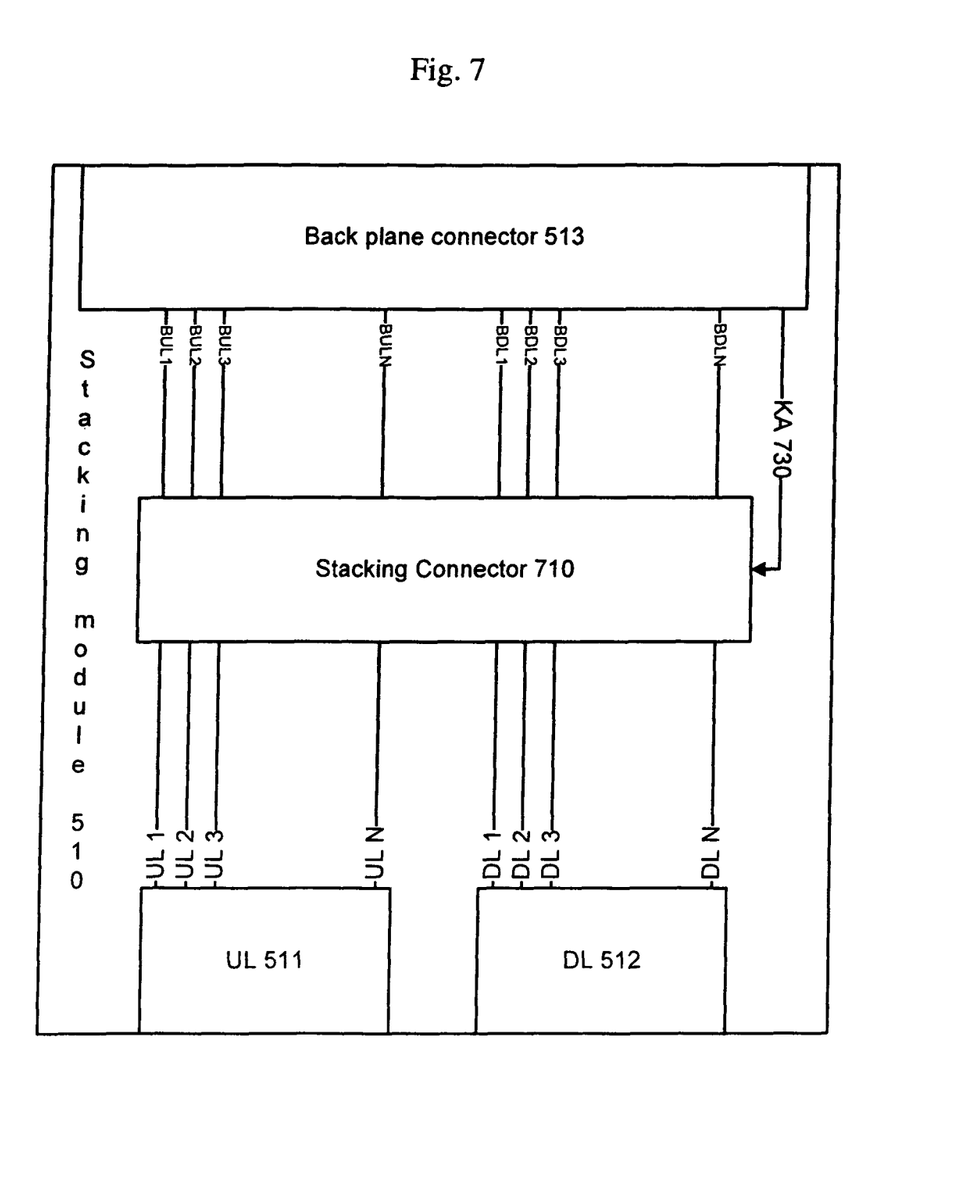
FIG. 7 shows new stacking module components disclosed in this invention.
Diagram

This invention introduces a new component, stacking connector (SC 710), between stacking ports and switch ASIC. This new component stacking connector SC 710 can be placed in stacking modules or in backplane board. The diagram FIG. 7 shows this SC 710 as placed in stacking module. All the connections from UL 511 and DL 512 are connected to SC 710, whereas SC 710 takes care of connecting them to backplane through backplane connector BP 720. BP 720 provides one additional keep alive signal KA 730 in compared to BP 513; otherwise the functionality of BP 513 and BP 720 is same. This signal KA 730 is connected to CPU on the backplane. On the stacking module, this KA730 is connected to SC 710.

Figure 8:
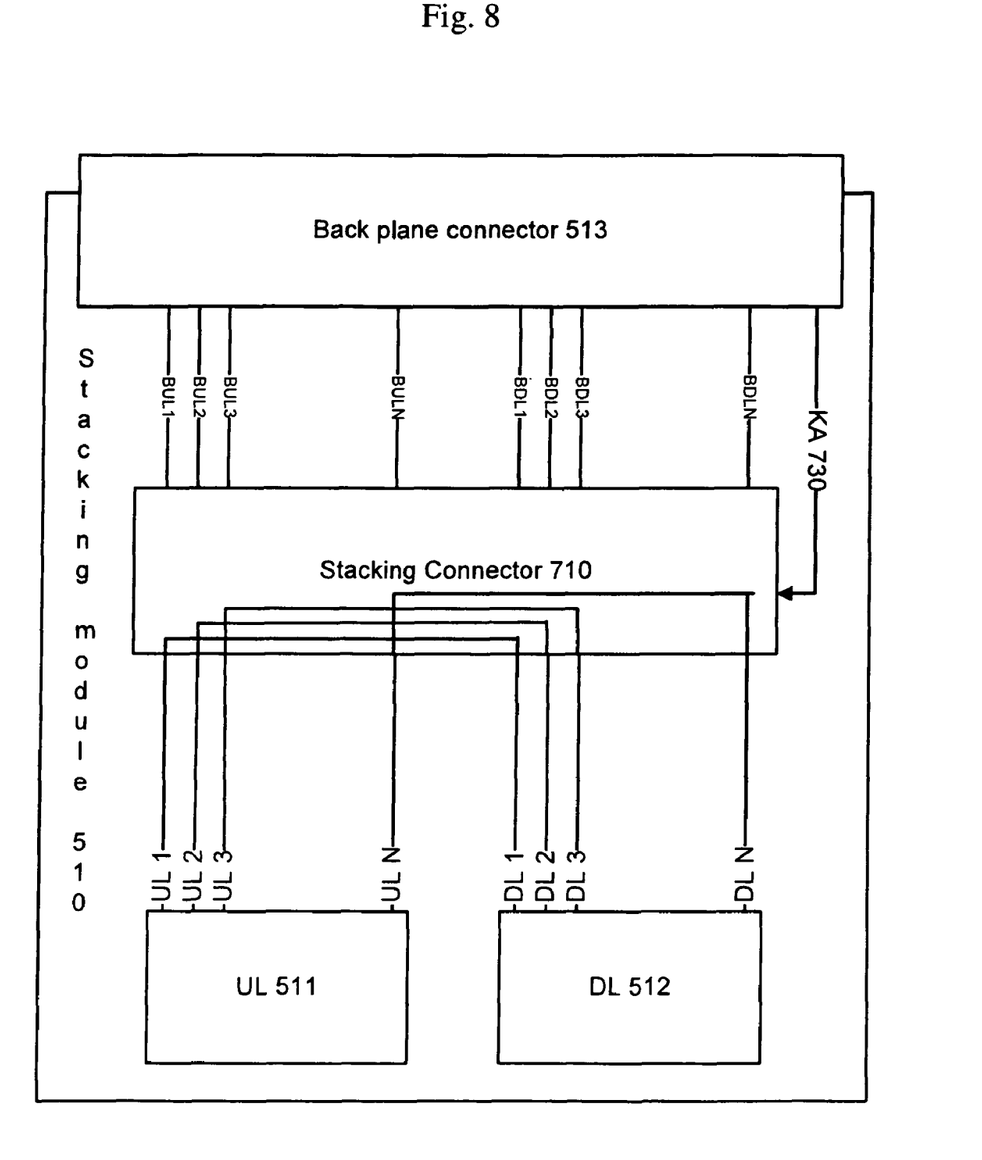
FIG. 8 shows short circuiting of uplink and downlink ports by stacking connector.
Diagram

SC 710 operates in two states as switch failure state (SF 750) and switch alive state (SA 751). SC 710 starts and stays in SF 750 by default. When there is no power on the circuit, SC 710 stays in SF 750 state. In this state, SC 710 connects the connections from UL 511 to DL 512. Basically it shorts the stacking ports. In this case SC 710 disconnects UL 511 and DL 512 from switching backplane and just shorts them as a connector. The diagram FIG. 8 shows this connection. In this case other switches connected in the stack do not detect this switch since UL 511 and DL 512 are shorted. It is equivalent to removing the switch and connecting cables to other adjacent switches directly. This is shown in diagram FIG. 9. In this diagram FIG. 9, the switch SW 105 is shown in SF 750 state. In this case it is equivalent to connecting SW 104 with SW 106 directly as SW 105 is not present.

Figure 10:
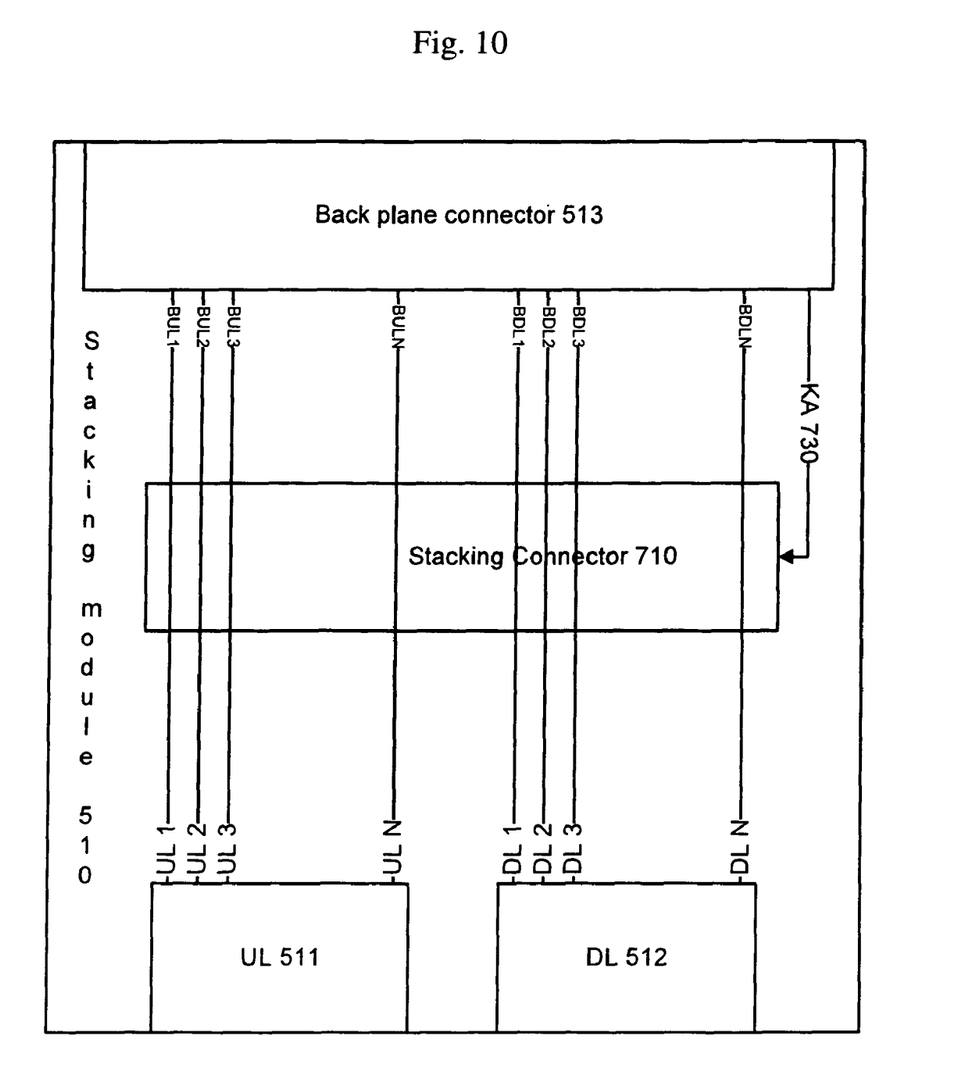
FIG. 10 shows stacking connector circuit connecting uplink and downlink ports to backplane connections transparently.
Diagram

SC 710 stays in SF 750 state even after power applied on the circuit. It changes the state only when it receives signal on connection KA 730. Once it receives a signal on KA 730, SC 710 moves to switch alive SA 751 state. In SA 751 state, SC 710 connects UL 511 and DL 512 connections to BP 720 directly. This is shown in diagram FIG. 10. In this state SC 710 provides transparent connections as equivalent to the connections of prior art stacking module shown in diagram FIG. 6. Additionally in this state, SC 710 runs a timer 760 for a predetermined time. When ever SC 710 receives a signal pulse on KA 730, it keep restarts this timer 760.

The signal KA 730 is a periodic pulse driven from CPU software 540. When the switch is up and running as fully functional CPU management software 540 generates this keep alive signal KA 730 periodically. SC 710 keeps monitoring this signal KA 730 and restarts its timer 760. If signals are not coming on KA 730 for a predetermined time, its timer 760 expires. SC 710 detects this timer expiry as failure in switch. This failure could be due to any software issue or any hardware issue on CPU or switch ASIC circuits.

Figure 9:
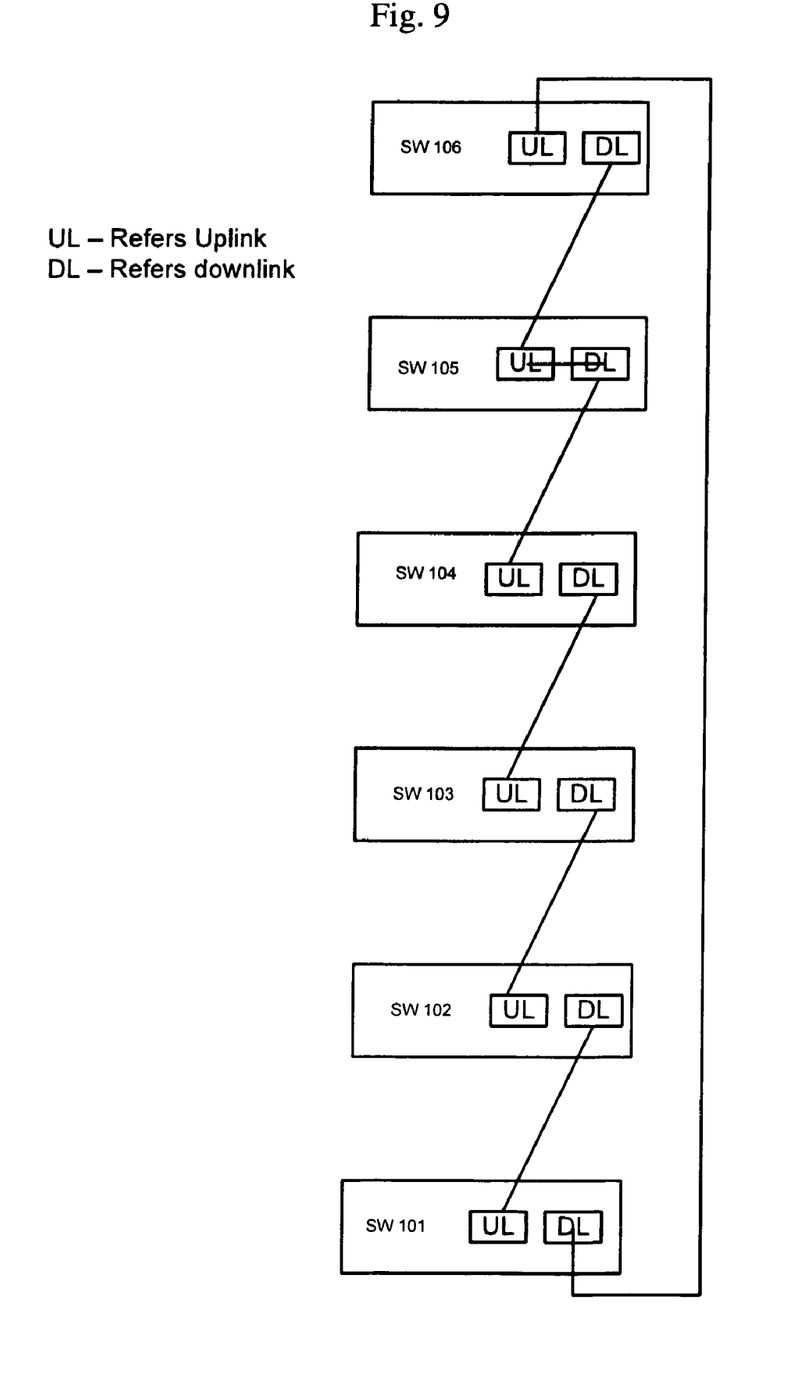
FIG. 9 shows stacking connections when a switch fails and short circuits the uplink and downlink ports.
Diagram

Once SC 710 detects failure due to timer expiry, it changes its state to switch failure state SF 750. The switch failure state SF 750 shorts UL 511 and DL 512 to remove this switch from stacking. Shorting UL 511 and DL 512 maintains physical connection for connecting other switches in the stack together. The diagram FIG. 9 shows this state of stack.

Figure 11:
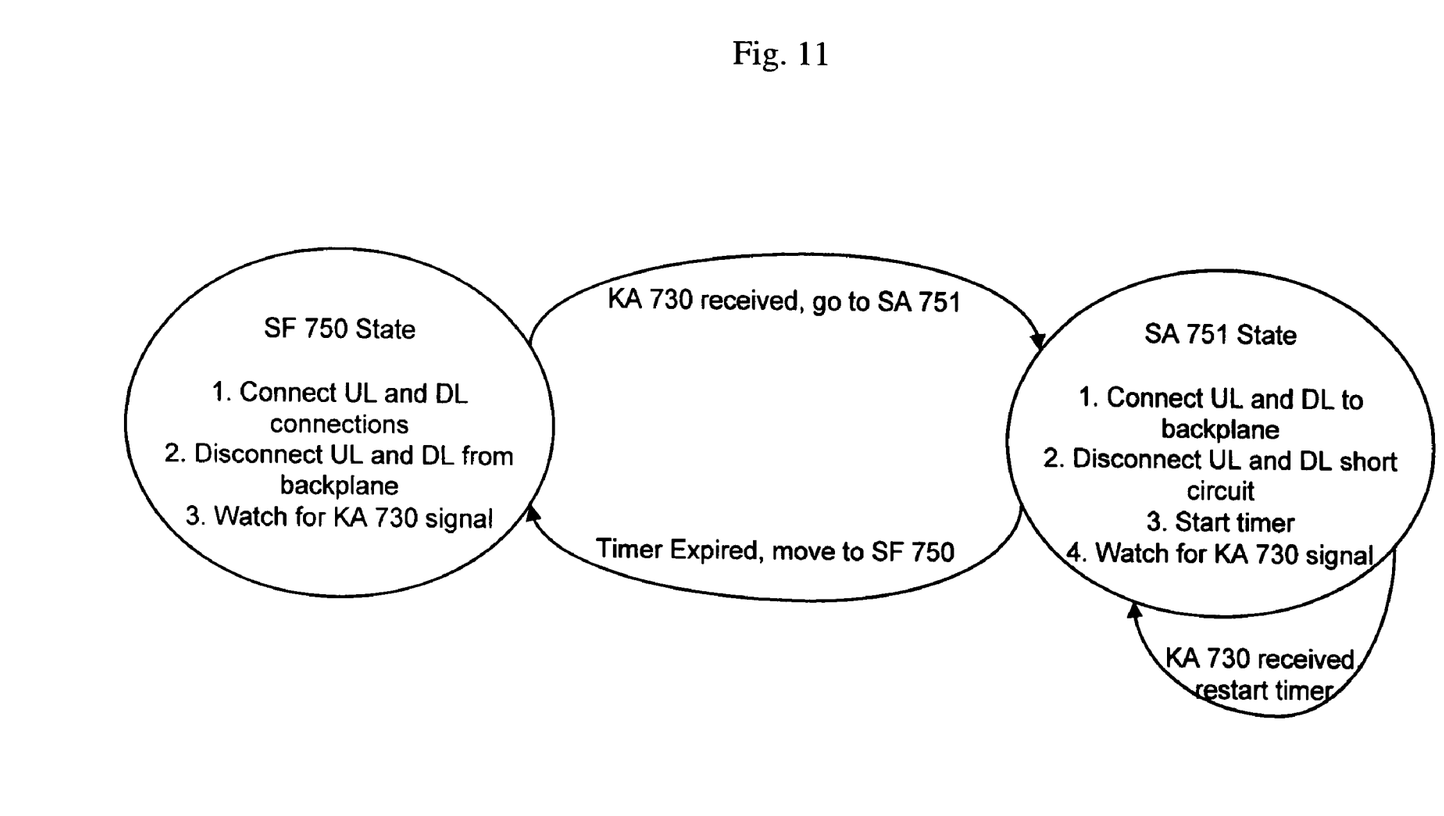
FIG. 11 shows state transition details of stacking connector circuit.
Diagram

The state transitions of SC 710 between SF 750 state and SA 751 state is shown in diagram FIG. 11.

Figure 12:
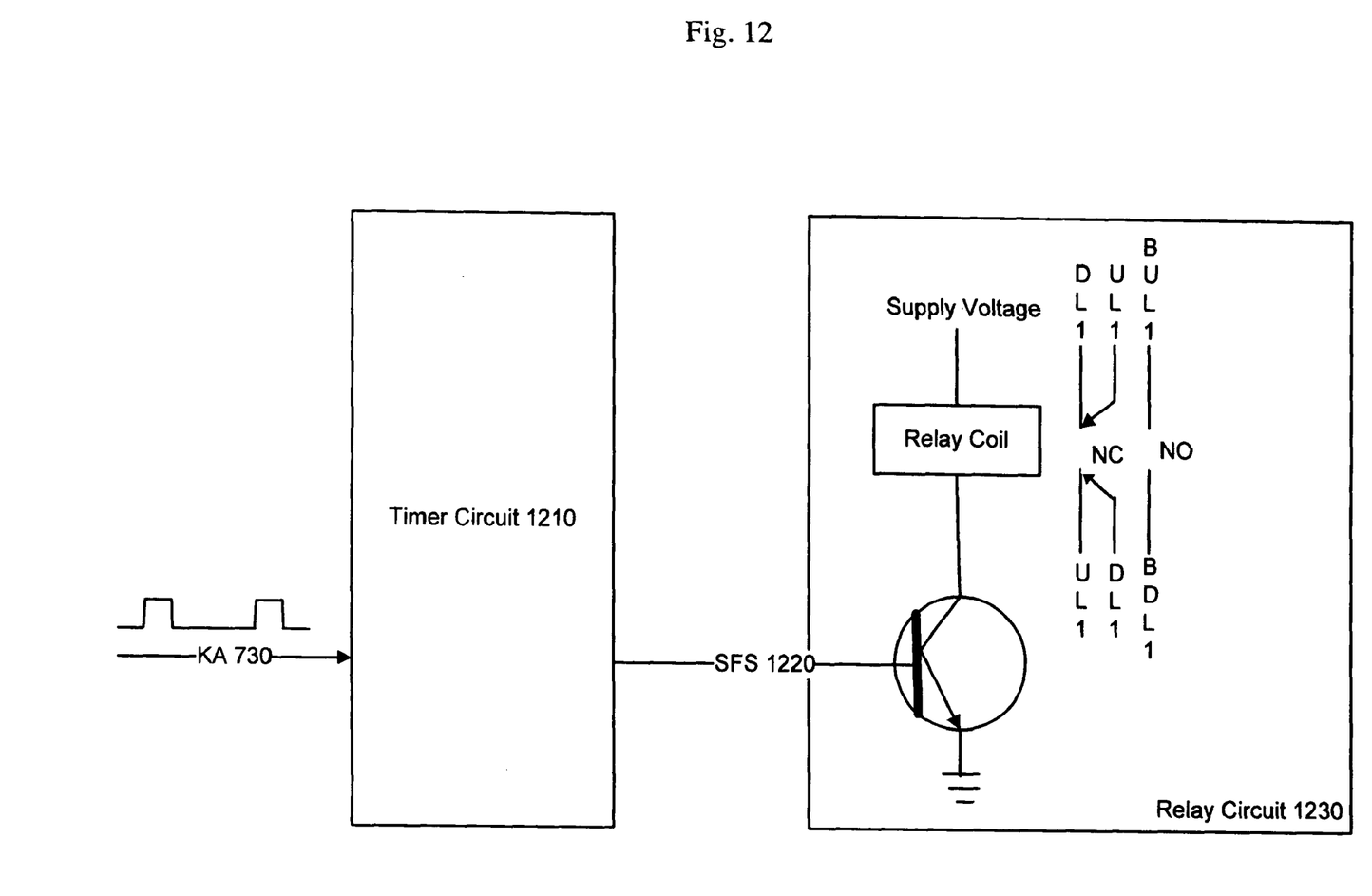
FIG. 12 shows details of stacking connector circuit.

SC 710 contains a simple timer circuit and a relay circuit. The diagram FIG. 12 shows the details of SC 710. Timer circuit 1210 provides simple timer circuit for a predetermined or a configurable time interval. The timer circuit 1210 takes KA 730 signal as input and drives the switch failure signal, SFS 1220, as output. Timer circuit 1210 keeps starting or restarting its timer when ever there is input pulse seen in KA 730. When the timer is running it keeps the output signal SFS 1220 as low. If the input pulses on KA 730 stops and the timer expires, timer circuit 1210 drives the output signal SFS 1220 high. This timer circuit can be designed with any timer integrated circuits (ICs) commonly available in market.

Relay circuit 1230 is a simple relay circuit designed with double pole double throw (DPDT) relay. The normally closed connections of relay are used to close the connection between uplink and downlink connections. The normally opened connections are used to connect the uplink and downlink connections to backplane connections. This relay circuit 1230 is driven by input signal, SFS 1220, from timer circuit 1210. When there is no input signal on SFS 1220, the relay is normally closed and connects the uplink connection with downlink connection. When input SFS 1220 is high, the normally opened connection is closed by relay and it connects uplink and downlink connectors with corresponding backplane connections. The diagram FIG. 12 shows only one relay to demonstrate the functionality. Based on the number of connections on stacking port, multiple relays are required. If uplink and downlink ports have N connections, N relays are required to be connected on the same fashion as shown in diagram FIG. 12.

This method of maintaining connectivity in switch failure scenarios disclosed in this invention helps achieving better fault tolerant systems with minimal additional cost.

While this invention has been described with specific details and the drawings, it is to be understood that the invention is not limited to these specific details. To the contrary, it is intended to cover various modifications as would be apparent to those skilled in the art. The circuits explained in this invention can be designed using many similar alternate components available in market. The new circuit SC 710 is placed in stacking modules; this can be placed in backplane board also between stacking ports and switch ASIC. The application of this invention though primarily explained with stacking switches, it can be applied to stack of any network devices including routers, and gateways. Therefore, the scope of appended claims should be accorded the broadest interpretation so as to encompass all such modifications.

I claim:

1. A method for maintaining stacking connectivity in failed units comprising the steps of
   (a) introducing a new stacking connector circuit between stacking ports and switch ASIC interfaces;
   (b) monitoring the health of the switch, using a keep alive pulse signal driven from a switch management software, by said new stacking connector circuit, sending periodically said keep alive pulse signal to said stacking connector circuit by said switch management software by under normal operating conditions, detecting failure by said stacking connector circuit in case of no keep alive pulse signals from said switch management software for a predetermined time;
   (c) connecting the stacking ports to said switch ASIC interfaces by said stacking connector circuit under normal operating conditions; and
   (d) disconnecting the stacking ports from said switch ASIC interfaces by said stacking connector circuit under failure conditions, short-circuiting the stacking ports connections from one port to other port, providing the physical connection on stacking interfaces to other switches, when there is no power on the switch by default stacking connector circuit, treating as failure condition and short-circuiting the stacking ports.

* * * * *